US009052218B2

(12) United States Patent
Heriban et al.

(10) Patent No.: US 9,052,218 B2
(45) Date of Patent: Jun. 9, 2015

(54) DEVICE FOR MEASURING THE POSITIONING OF A MICROACTUATOR

(75) Inventors: David Heriban, Ecole Valentin (FR); Joël Agnus, Auxon Dessous (FR); Ronan Noizet, Besancon (FR)

(73) Assignees: UNIVERSITE DE FRANCHE COMTE, Besancon (FR); CENTRE NATIONAL DE LA RECHERCHE SCIENTIFIQUE CNRS, Paris (FR); ECOLE NATIONALE SUPERIEURE DE MECANIQUE ET DES MICROTECHNIQUES, Besancon (FR); David Heriban, Ecole Valentin (FR)

( * ) Notice: Subject to any disclaimer, the term of this patent is extended or adjusted under 35 U.S.C. 154(b) by 164 days.

(21) Appl. No.: 13/575,336

(22) PCT Filed: Jan. 17, 2011

(86) PCT No.: PCT/FR2011/000028
§ 371 (c)(1),
(2), (4) Date: Oct. 12, 2012

(87) PCT Pub. No.: WO2011/092396
PCT Pub. Date: Aug. 4, 2011

(65) Prior Publication Data
US 2013/0027027 A1 Jan. 31, 2013

(30) Foreign Application Priority Data
Jan. 27, 2010 (FR) .................................. 10 00307

(51) Int. Cl.
*G01B 7/14* (2006.01)
*G01D 5/14* (2006.01)
(52) U.S. Cl.
CPC ..................................... *G01D 5/145* (2013.01)

(58) Field of Classification Search
CPC .............................. G01B 7/003; G01D 5/145
USPC ..................................................... 324/207.11
See application file for complete search history.

(56) References Cited

U.S. PATENT DOCUMENTS

| 6,791,219 B1 * | 9/2004 | Eric et al. ..................... 310/68 B |
| 6,898,548 B2 | 5/2005 | Flament et al. |
| 7,804,210 B2 | 9/2010 | O'Day et al. |
| 2004/0021458 A1 | 2/2004 | Imamura |
| 2010/0045275 A1 | 2/2010 | Frachon |

FOREIGN PATENT DOCUMENTS

| DE | 19600616 A1 | 7/1997 |
| EP | 1365208 A1 | 11/2003 |

(Continued)

OTHER PUBLICATIONS

International Search Report dated Mar. 24, 2011, from corresponding PCT application, PCT/FR2011/000028.

*Primary Examiner* — Reena Aurora
(74) *Attorney, Agent, or Firm* — Young & Thompson

(57) ABSTRACT

A microtechnique device includes an actuator, designed to move movable equipment with a permanent magnet with respect to a support. The actuator is designed to move the movable equipment in two degrees of freedom from a position of rest, and the permanent magnet is chosen to have a magnetic field distribution that presents a main plane of symmetry and a main direction of magnetization passing through a center. The device includes a first magnetic sensor and a second magnetic sensor, these two being designed to detect a movement of the magnet. The sensors are positioned with respect to the position of rest of the magnet in a specific manner in the main plane of symmetry of the magnetic field and near to extrema. The first and second sensors are then sensitive to the movements of the movable equipment perpendicular to their respective working axes.

12 Claims, 8 Drawing Sheets

(56) References Cited

FOREIGN PATENT DOCUMENTS

Figure 6:
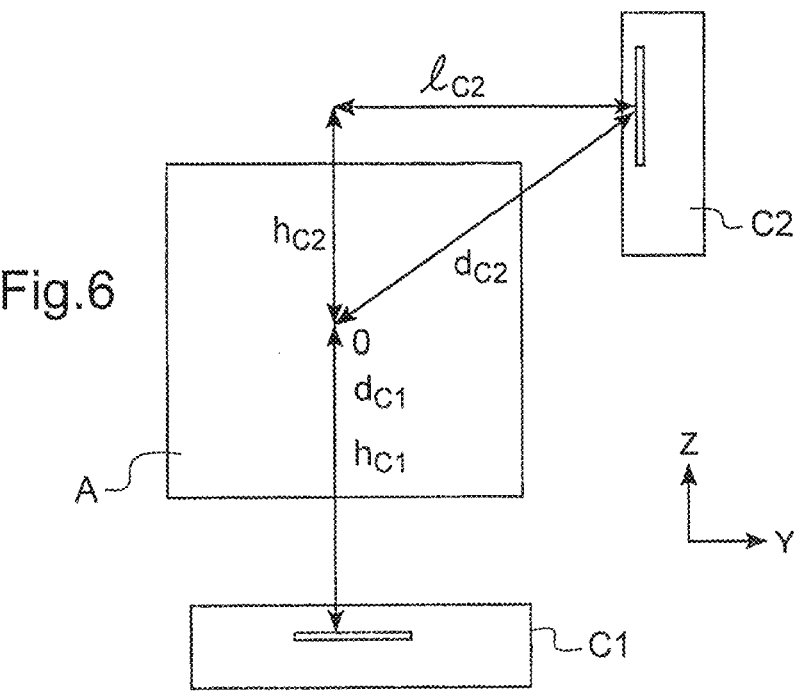

| FR | 2845026 | A1 | 4/2004 |
|---|---|---|---|
| FR | 2909170 | A1 | 5/2008 |
| WO | 0167034 | A1 | 9/2001 |
| WO | 2004028756 | A2 | 4/2004 |
| WO | 2008071875 | A2 | 6/2008 |
| WO | 2009120507 | A2 | 10/2009 |

* cited by examiner

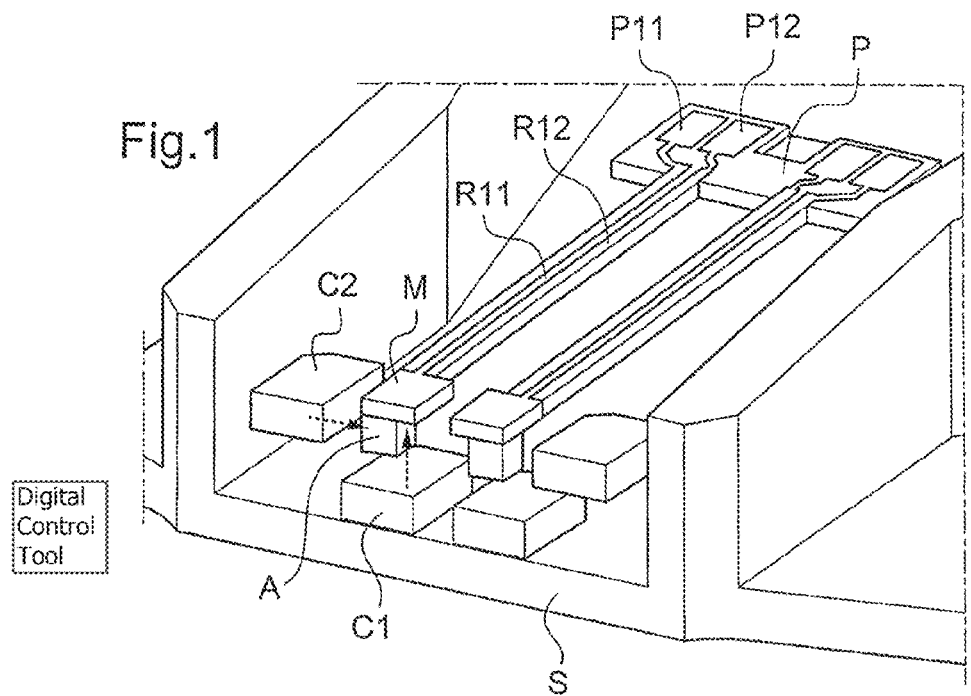
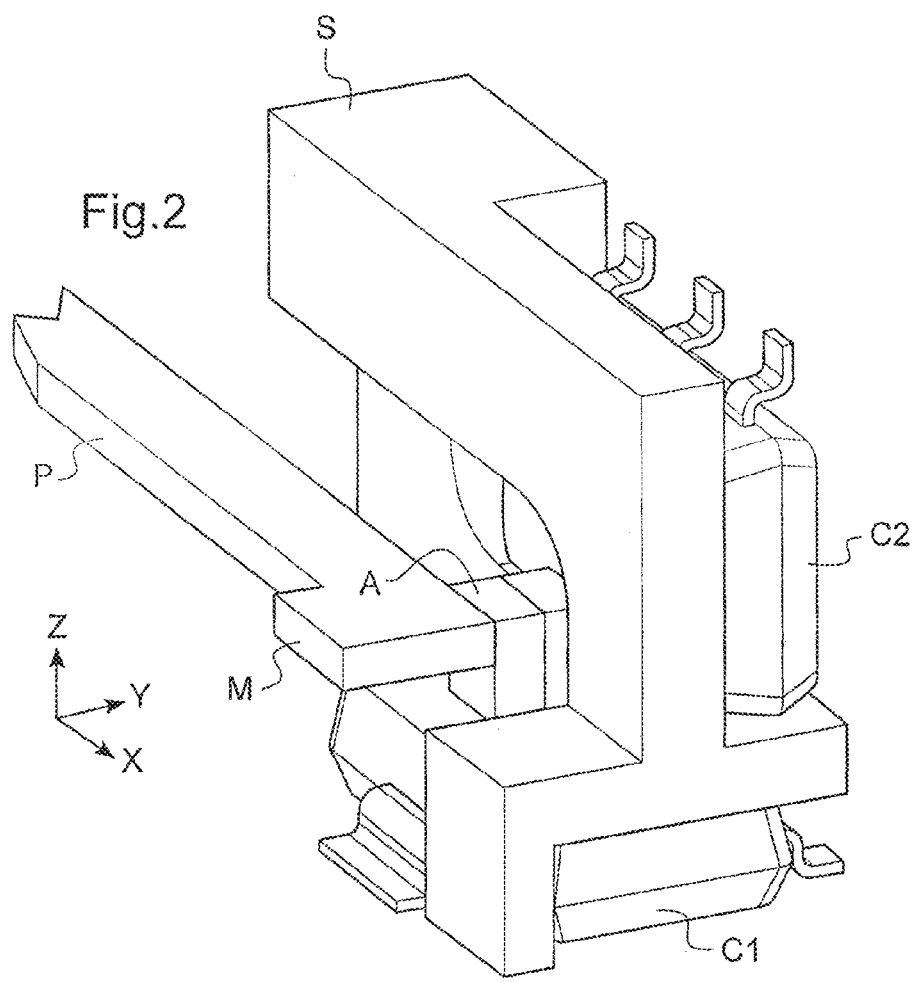

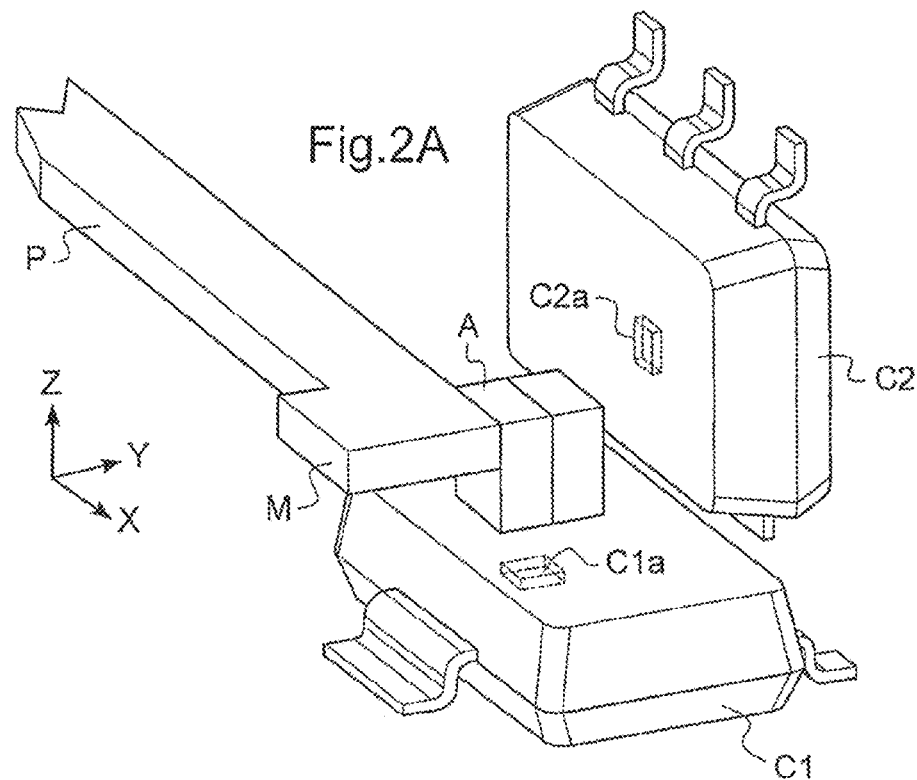
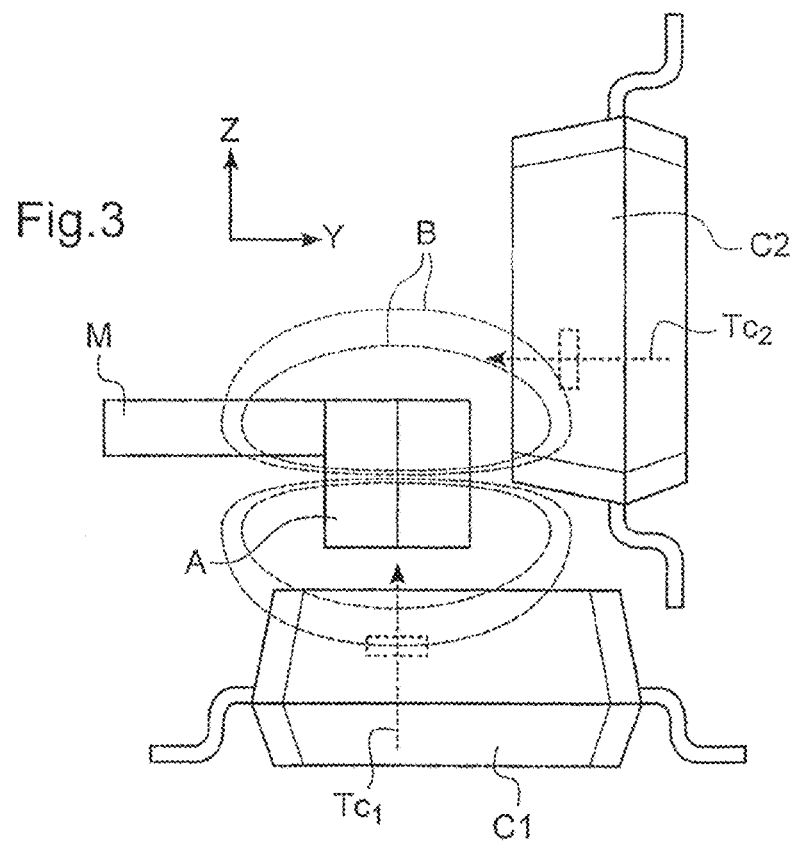

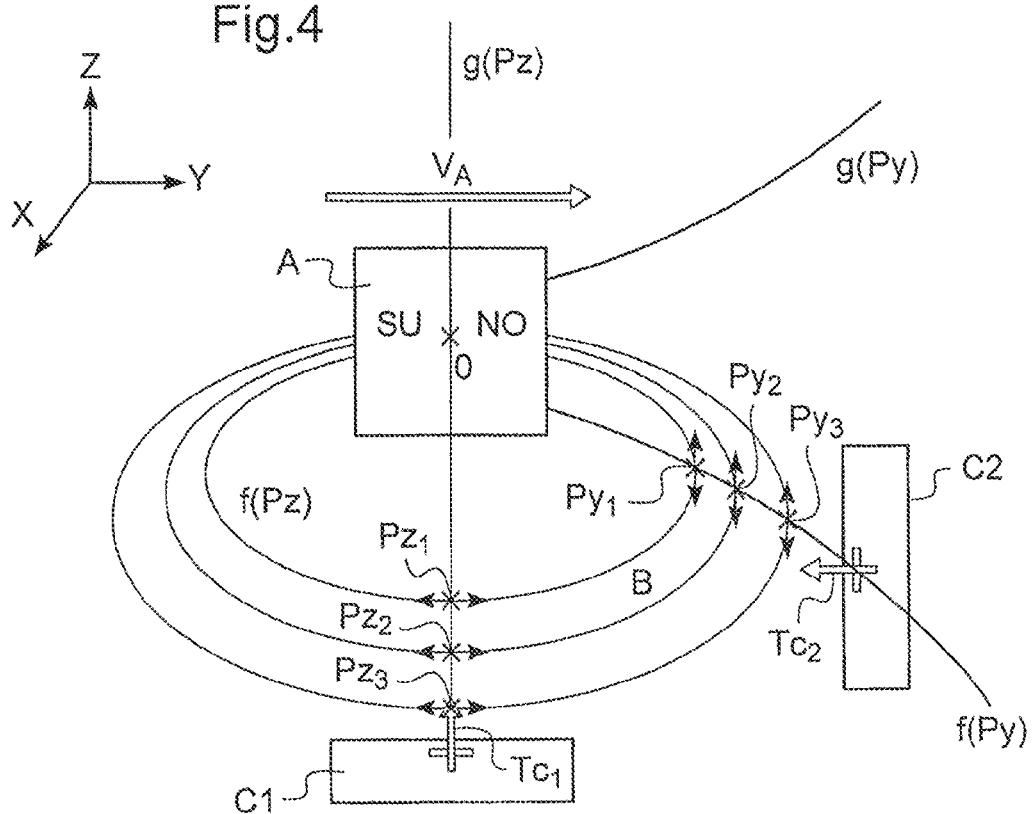
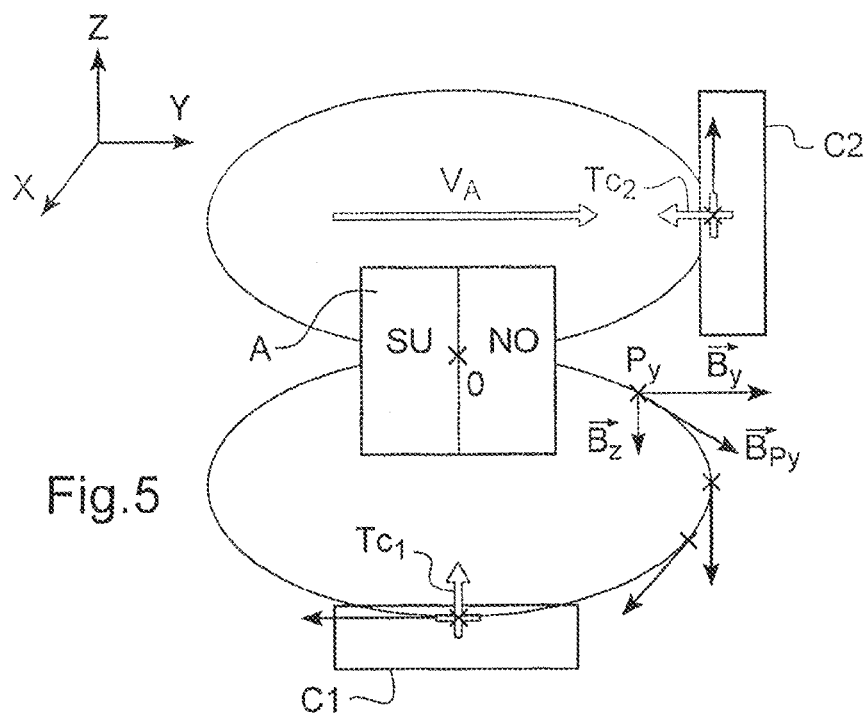

DEVICE FOR MEASURING THE POSITIONING OF A MICROACTUATOR

The present invention relates to a microtechnology device for measuring the position of a microactuator.

The detection and measurement of magnetic fields is widely used in the industrial world. In particular, it is possible to detect the presence of a magnet or to measure a specific position of this magnet in a physical environment (speed sensor, position sensors).

More precisely, magnets emit a magnetic field which has to be analysed by an ambient sensor. Sensors known for this purpose are Hall effect sensors.

In the case of a position sensor using measurement of the magnetic field of a permanent magnet by a magnetic field sensor, its positional resolution is degraded exponentially as a function of the distance of the magnet and magnetic sensor. The further away the magnet, the worse the resolution of the position sensor and the more the magnetic and electronic noises become preponderant over the measurement. This degradation is linked to the physical nature of the magnetic fields and the performance of the magnetic sensors.

The known industrial applications of the magnetic field generally operate at a macroscopic level which involves complex and expensive apparatus to increase resolution and filter the noise as mentioned above. Other applications are limited to determining the position or orientation of an object in a magnetic field; or content themselves with measuring movements that comprise only one degree of freedom.

The publication WO 2008/071875 describes a sensor for measuring the movement of a magnet. To allow movements of several millimeters, the magnet is defined in a Cartesian or cylindrical coordinate system and the position sensors are of a linear or rotary nature.

The publication WO 2009/120507 describes a positioning probe capable of detecting a magnetic field in relation to magnets mounted on an armature. The movements measured are limited to only one degree of freedom.

The publication WO 01/67034 describes a method of determining the position or orientation of an object with the aid of a magnetic field. For this, a sensor is fixed to the object the position or orientation of which is to be determined.

All this means that certain technological fields, which require high resolution and great precision in the measurement of position, cannot make use of the methods or apparatus known in the prior art in relation to magnetic field sensors. Of these fields, micro- and nanotechnologies are particularly affected.

Micro- and nanotechnologies are evolving rapidly. These technologies use manufacturing and processes on a sub-millimeter scale, i.e. at the micrometer and nanometer level.

The applications of micro- and nanotechnologies are vast and are used in particular for micro-machining during the manufacture of microsystems (electronic chips of the sensor/actuator type) or electromechanical microsystems/nanosystems (MEMS: "microelectromechanical systems", MST: "microsystem technology" or NST: "nanosystem technology").

The above-mentioned systems are used in very varied fields, which include for example the automotive industry, aeronautics, telecommunications, biotechnology, medicine, physics, information science, electronics, molecular engineering or nanomaterials engineering.

Other fields such as mechatronics nowadays use micro- or nanotechnological systems. Mechatronics combines electronics, mechanics and information science to control complex systems.

Micro- or nanotechnological equipment conventionally uses materials of the piezoelectric, silicon or similar types. The physical phenomena used are essentially based on the thermal, magnetic, piezoelectric, electrostatic or similar properties of the materials used. The very nature of the material and its physical properties make it possible to produce compact systems that generate high resolution movements (1 nm to 1 µm).

As already indicated, these technologies operate on the micro- or nanometer scale and involve great precision. However, the physical phenomena utilised are generally non-linear and are disrupted by the environment (particularly the thermal or piezoelectric phenomena). Consequently, the micro- and nanotechnologies resort either to costly and sophisticated external apparatus such as laser measurement equipment or interferometers to mitigate the lack of precision mentioned above, or to items of equipment within the micro- or nanosystem, which are themselves subject to disruptive physical phenomena.

Added to this is the fact that the error correction equipment used is generally bulky and runs counter to the miniaturisation that is desired in micro- or nanotechnology.

The invention sets out to improve the situation.

The Applicant has observed that moving to a microscopic scale considerably alters the value of applying magnetic field measurements once a specific positioning of the magnetic sensors is respected.

The microtechnology apparatus proposed is of the type comprising an actuator arranged to move moving elements relative to a support, these moving elements comprising a permanent magnet and a first magnetic sensor arranged to detect movement of the magnet. It is notable in that the actuator is arranged so as to move the moving elements in two degrees of freedom from a resting position, and two-dimensional measurement will also be carried out. The permanent magnet is preferably chosen to have a magnetic field distribution that presents a main plane of symmetry, as well as a main direction of magnetisation passing through a centre. The first sensor is placed substantially in the said main plane of symmetry, at a first working distance from the magnet, whereas the working axis of this first sensor is substantially perpendicular to the main direction of magnetisation, and passes substantially through the centre, in the resting position of the magnet. There is a second magnetic sensor placed substantially in the main plane of symmetry of the magnetic field, at a second working distance from the magnet, whereas the working axis of this second sensor is substantially parallel to the main direction of magnetisation, in the resting position of the magnet. Finally, the second sensor is positioned close to an extremum, for the said second working distance, the said extremum being situated at a location for which the component on the working axis of the gradient of the component along the main direction of magnetisation is at a maximum. The first and second sensors are then sensitive to the movements of the moving elements perpendicular to their respective working axes.

Other features are of interest, separately or in combination:
  the first sensor is positioned on the surface of a sphere centred substantially on said centre and having a radius of between 500 µm and 2000 µm, preferably between 1000 µm and 1200 µm, and is still more preferably substantially equal to 1100 µm;
  the second sensor is positioned on the surface of a sphere centred substantially on said centre and having a radius of between 500 µm and 2000 µm, preferably between 1100 µm and 1500 µm, and is still more preferably substantially equal to 1360 µm;

each actuator is selected from the group comprising a piezoelectric actuator, a thermal actuator, a magnetic actuator and/or an electrostatic actuator;

the moving elements of said actuator are arranged for translational movement of the magnet over a distance of between 0 µm and 200 µm in a direction parallel to the main direction of magnetisation;

the movable part of the actuator is arranged for translational movement over a distance of between 0 µm and 400 µm in a direction perpendicular to the main direction of magnetisation.

The invention also relates to a device as defined hereinbefore, with the addition of a digital control tool capable of storing the conversion parameters in order to convert magnetic field measurements made by the sensors into positional data for the magnet and/or moving elements. This is also known as a mechatronic device.

Figure 7:
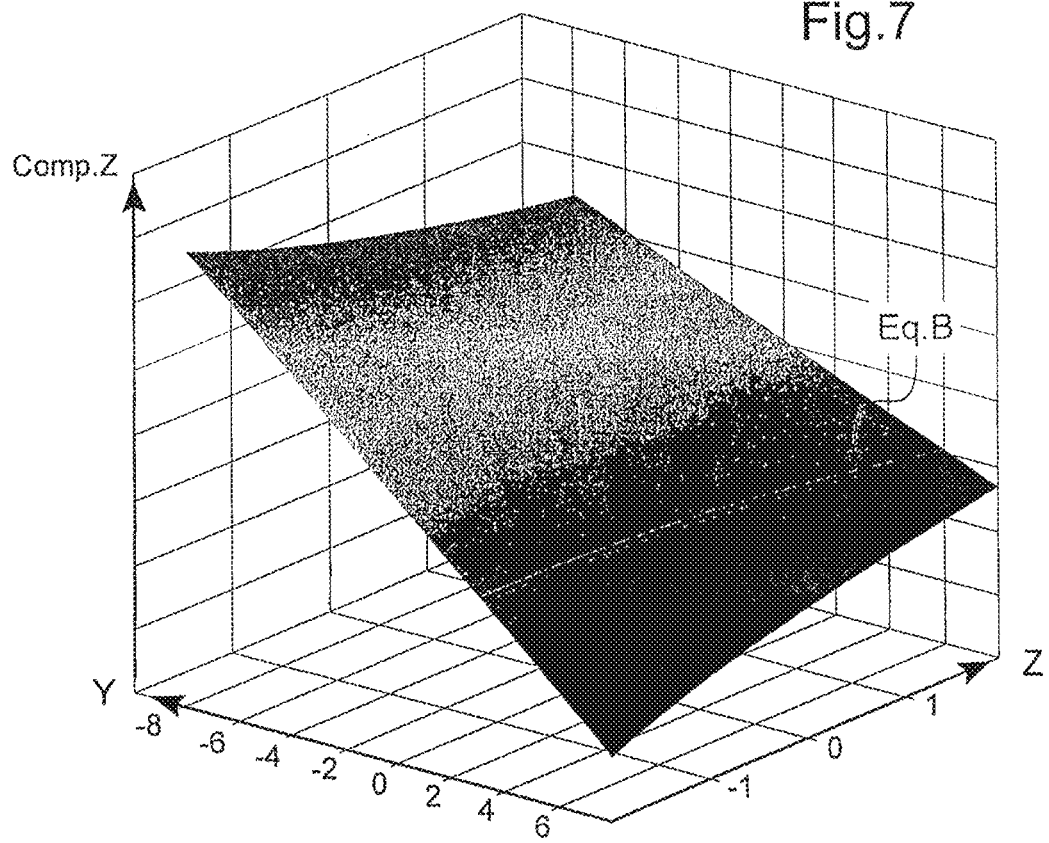
Figure 8:
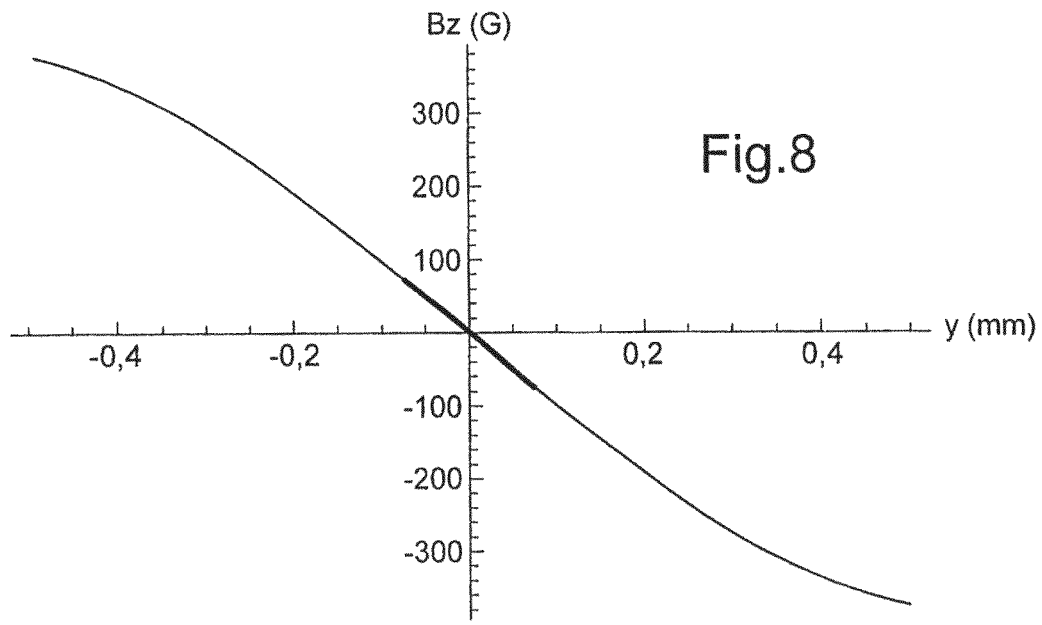
Figure 8A:
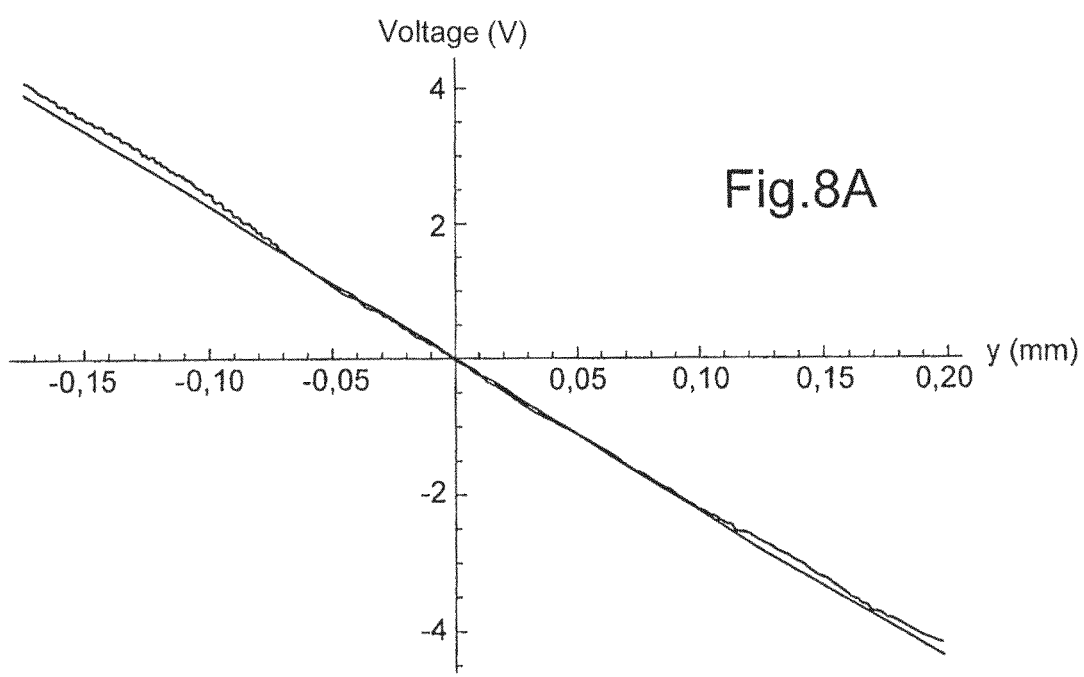
Figure 9:
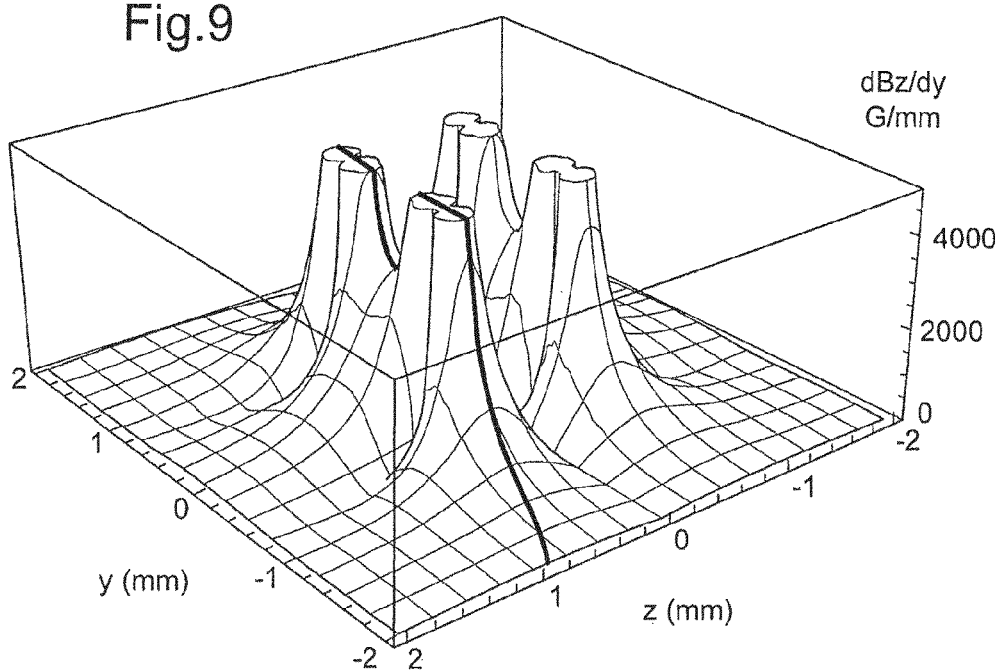
Figure 10:
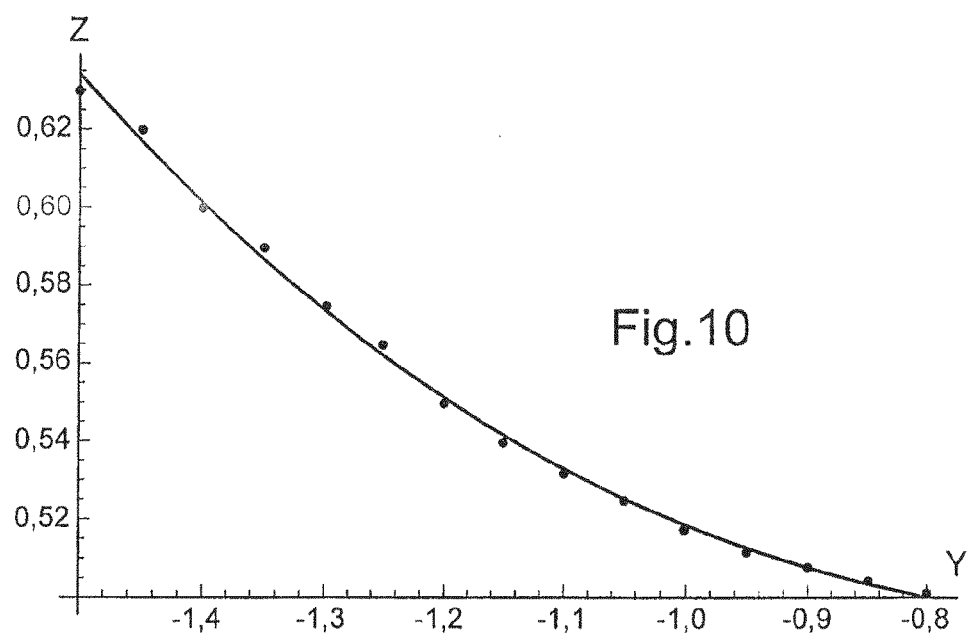
Figure 11:
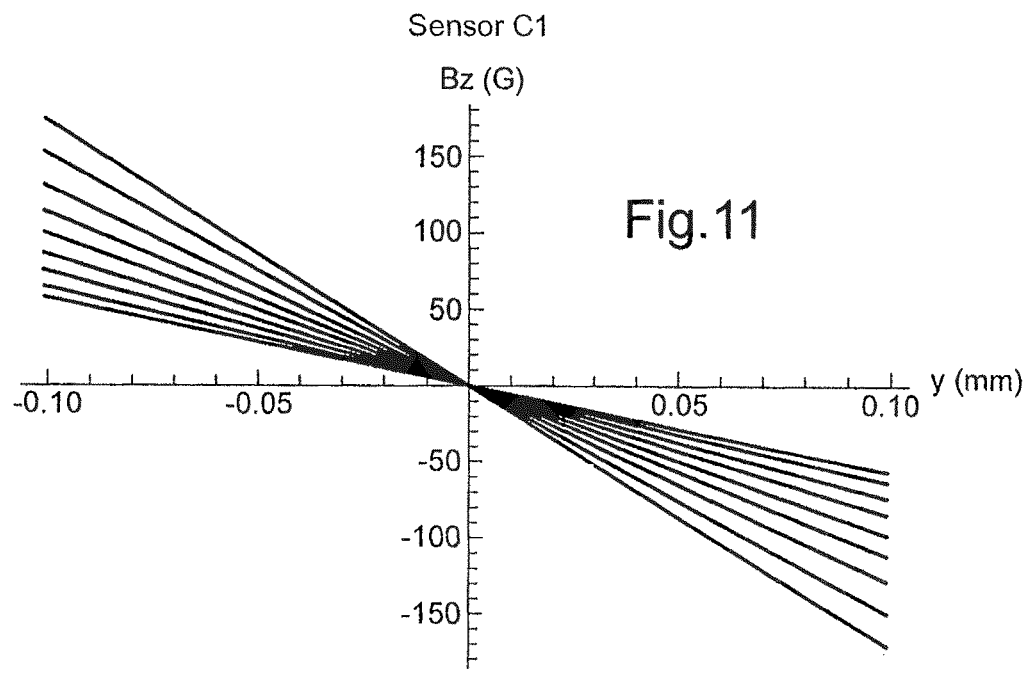
Figure 12:
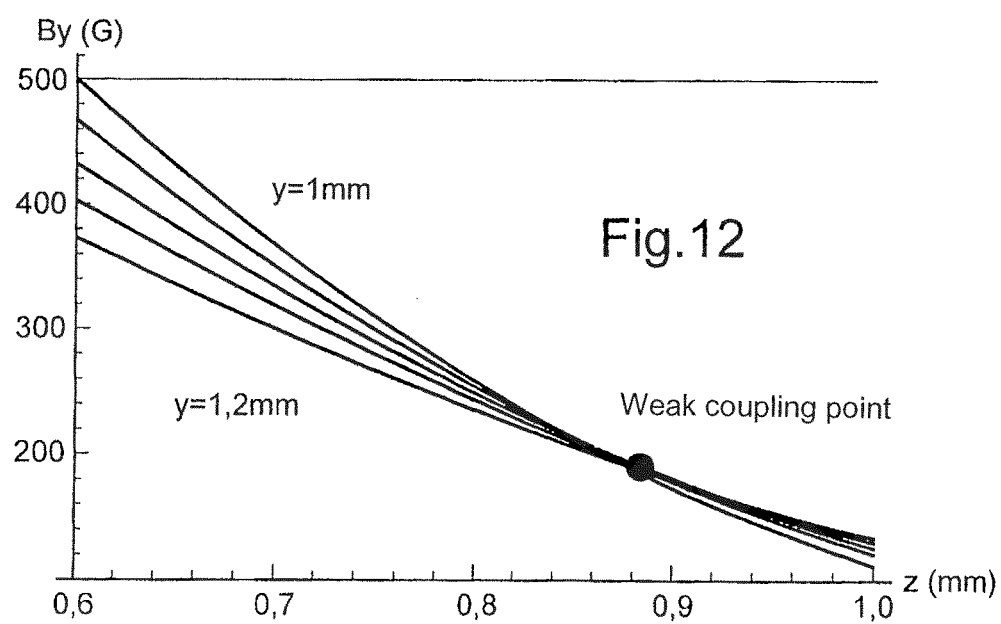
Figure 13:
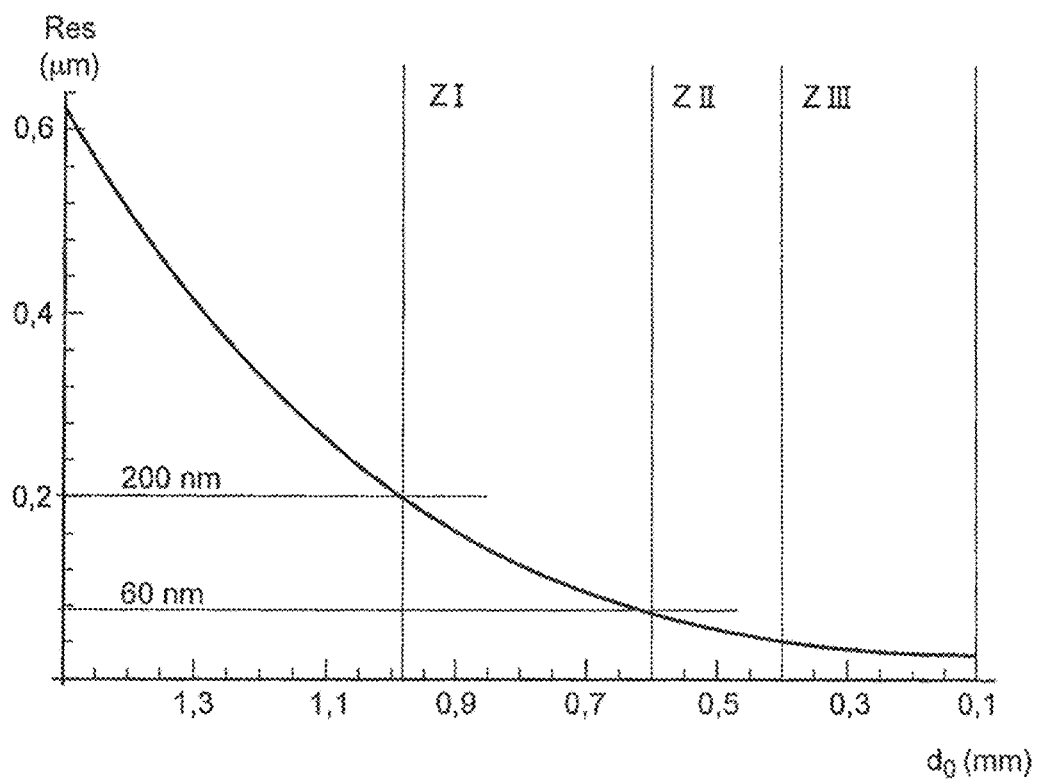

Further advantages and features of the invention will become apparent from reading the detailed description that follows and the attached drawings, wherein:

FIG. 1 schematically shows a perspective view of a microtechnology device according to one embodiment of the invention, FIG. 2 is a perspective view of the part of the microtechnology device where the invention comes into play, FIG. 2A is the same view as in FIG. 2, but not showing the support S, for better visibility, FIG. 3 is another view similar to FIG. 2A, showing magnetic field lines, FIG. 4 is another perspective view showing points of maximum gradient in the magnetic field, FIG. 5 is another view similar to FIG. 3, showing vectorial notations of the magnetic field, FIG. 6 is another view similar to FIG. 3, showing notations of positional magnitudes in space, FIG. 7 is a three-dimensional graph showing the evolution of a magnetic field in two directions, FIG. 8 shows the general pattern of variation in the magnetic field over a sensor in direction y, where z is constant, FIG. 8A is a graph that compares experimental measurements carried out with a device according to the invention at low values of y with a linear evolution, FIG. 9 is a three-dimensional graph showing the variations in a magnetic field gradient dBz/dy in two directions, FIG. 10 is a graph plotted with x coordinates in direction y, and y coordinates in direction z, FIG. 11 is a two-dimensional graph of the variation in the magnetic field on a sensor, FIG. 12 is a two-dimensional graph of the variation in the magnetic field on another sensor, FIG. 13 shows a spatial resolution as a function of the distance between sensor and magnet.

The drawings and the description that follow essentially contain elements of a certain nature. The drawings show, at least to some extent, aspects that are difficult to describe other than in drawings. They form an integral part of the description and may therefore not only help with a better understanding of the present invention but may also contribute to its definition in some cases.

The same is true of the formulae appended to the present description.

FIG. 1 shows a perspective view of a microtechnical device according to one embodiment of the invention. The device comprises two symmetrical parts. Each one comprises an actuator P arranged to move moving elements M relative to a support S. The moving elements M carry a permanent magnet A integral therewith. In this embodiment the magnet A is fixed to a lower surface of the moving elements M, which is in the resting position here.

In the embodiment described the actuator P is of the piezoelectric type. Alternatively, actuators sensitive to electrostatic or thermal effects, in particular, might be envisaged.

Here, the actuator P comprises a piezoelectric element acting on a beam that is deformable in space to allow translational movement of the moving elements M relative to a support S. The deformable beam here constitutes the moving element itself, which is provided on its upper surface with two conductive strips R11 and R12 ending at connection terminals P11 and P12. The same is true of the lower surface (the strips and terminals underneath are not visible). The beam M is a piezoelectric bilayer with a horizontal earth electrode between the layers. One of the layers causes the beam to be deformed in one direction, and the other in the other direction.

Thus, the movement of the moving elements M and of the magnet takes place in two degrees of freedom from a resting position. This means in principle two degrees of freedom in translational movement in two perpendicular directions. However, a more complex movement with two degrees of freedom may also be envisaged.

According to the invention, the permanent magnet A is selected with a magnetic field distribution which presents a main plane of symmetry and a main direction of magnetisation passing through a centre. Here, the magnet is a regular cube. It has a volume of about 1 mm$^3$.

For each beam M and each magnet, the microtechnology device comprises sensors C1 and C2 sensitive to the magnetic field emitted by the magnet A along respective working axes represented by discontinuous arrows. The sensors are fixed to the support S.

In the embodiment described, Hall effect sensors are used, for example the model HAL401 made by MICRONAS GmbH of Freiburg, Germany. Obviously, other analogous sensors may be provided. The sensors are arranged on the support structure to respond to a sensitivity of about 800 to 1200 G/mm (gauss per millimeter).

In the microtechnology device in FIG. 1, the actuator P, the moving element M, the magnet A and the sensors C1 and C2 are duplicated. Thus, the different elements and most particularly the moving elements are able to cooperate with one another to form piezoelectric tongs intended for micromanipulation operations, as described for example in FR 2845026. For this purpose, a digital control tool is provided which is capable of storing conversion parameters for converting magnetic field measurements by the sensors into positional data for the magnet and/or moving element.

An experimental embodiment with a single moving element which does nothing but carry the magnet will now be described. The arrangement described may be applied to the two moving elements in FIG. 1.

FIGS. 2 and 2A show that the magnet A is fixed laterally to the moving element M of the actuator P. The moving element M is in the resting position and is arranged for movement in two degrees of freedom y and z starting from this resting position.

According to the invention, the moving element M of the actuator P allows a total travel of about 400 µm along the axis z and a total travel of about 200 µm along the axis y. In other words the relative up/down movement (direction+/−) is respectively about 200 µm along the axis z starting from the resting position; and the relative left/right movement (direction+/−) is respectively about 100 µm along the axis y starting from the resting position.

The sensors C1 and C2 in FIG. 2 are fixed to the support S. Each sensor is positioned in a specific manner. The specific positioning is carried out as a function of the magnetic field lines. The sensors C1 and C2 have sensitive zones, C1a and C2a, respectively. The positioning of the sensor is defined as the positioning of the centre of its sensitive zone relative to the centre of the magnet (or of the magnetic field).

The specific positioning may vary within certain limits. This is mainly due to the very nature of the magnetic fields, their physical properties and particularly their symmetry. To this end, the invention relates to a permanent magnet having a magnetic field distribution which allows a main plane of symmetry. The magnetic field also allows a main direction of magnetisation passing through a centre. The freedom of variation makes it possible to adapt the device according to the invention as a function of the size of the sensors which are often provided with casings that are more or less bulky.

FIG. 3 schematically shows a front view of an alternative embodiment of the microtechnological device according to the invention.

The moving element M is movable in translation along the axes y and z in the frame of movement.

The permanent magnet A is arranged for a magnetic field distribution that allows a main plane of symmetry. As it is a cube magnet, which has two planes of symmetry, one of these, defined by two axes y and z, is taken as the main plane. The field lines of the magnetic field B are three-dimensional, but particular consideration will be given to those that extend in this main plane of symmetry.

The sensors C1 and C2 are placed as a function of these field lines and each act along respective working axes represented by broken arrows; working axis $T_{C1}$ for the sensor C1 and working axis $T_{C2}$ for the sensor C2. The working axis $T_{C1}$ of the sensor C1 is directed along the axis z and the working axis $T_{C2}$ of the sensor C2 is directed along the axis y. Precisely, each sensor measures one component (scalar value) of the magnetic field along its respective working axis.

FIG. 4 shows a general diagram of a magnetic field B of a permanent magnet and its field lines. FIG. 4 also shows the arrangement of the sensors C1 and C2 in this field B. More particularly, FIG. 4 describes the specific positioning of the sensors C1 and C2 according to one embodiment of the invention.

FIG. 5 precisely shows the placing of the sensors C1 and C2 according to another embodiment.

It should be remembered that the magnetic field B is three-dimensional (FIGS. 4 and 5: axes x, y and z), but the placing of the sensors C1 and C2 is chosen to be in a common plane.

The permanent magnet A is chosen with a magnetic field distribution B which presents a main plane of symmetry, and a main direction of magnetisation $V_A$. One can also define the magnetisation axis which is parallel to $V_A$ passing through the centre O and through the south and north poles SU and NO, respectively, of the permanent magnet A. The centre O is the physical centre of the source of the magnetic field B. It is at the intersection of two planes of symmetry of the magnetic field generated by the magnet A and of the interface plane between the north and south poles of the magnet A. In principle, it is also the centre of gravity of the permanent magnet A.

The difference between the positioning of the sensors C2 of the embodiments shown in FIGS. 4 and 5, respectively, is linked with the symmetry of the magnetic field emitted by the permanent magnet A, in the "secondary" plane of symmetry perpendicular to the main plane of symmetry mentioned previously. However, each position of C2 substantially meets the specific conditions described hereinafter.

The sensors C1 and C2 are positioned as a function of the field lines. More precisely, the sensor C1 is placed substantially in the main plane of symmetry. The working axis z of this first sensor C1 is substantially perpendicular to the main direction of magnetisation $V_A$ and passes substantially through the centre O, in the resting position of the magnet.

A "working distance" between the magnet and a sensor will now be discussed. This is the distance between the centre of gravity O of the magnet (or centre of the magnetic field) and the centre of the sensitive zone of the sensor.

FIG. 6 illustrates notations which will be used hereinafter:

$d_{C1}$—distance between the sensor C1 and the centre O of the permanent magnet A.

$h_{C1}$—distance in direction z between the sensor C1 and the centre O of the magnet.

$d_{C2}$—distance between the sensor C2 and the centre O of the magnet.

$h_{C2}$—distance in direction z between the sensor C2 and the centre O of the magnet.

$l_{C2}$—distance in direction y between the sensor C2 and the centre O of the magnet.

More generally, the first sensor (C1) is placed substantially in the main plane of symmetry at a first working distance $d_{C1}$ from the magnet. The working axis (z) of this first sensor (C1) is substantially perpendicular to the main direction of magnetisation (AA) and passes substantially through the centre (O) in the resting position of the magnet. Thus, in principle, we have:

$$d_{C1}=h_{C1}$$

In practice, the first sensor C1 is positioned on the surface of a sphere centred substantially on the centre O. The radius of this sphere may be between 500 μm and 2000 μm, preferably between 1000 μm and 1200 μm. Preferably, the radius of the sphere is still substantially equal to 1100 μm, namely $d_{C1}=1100$ μm. The essential condition to respect is a positioning in the vicinity of an extremum selected from among all the extrema $P_{z1}$, $P_{z2}$, $P_{z3}$ etc. and to avoid knocking the magnet physically when the latter assembly is moved with the moving element.

Thus, it is observed that the sensor C1 is positioned close to an extremum P. To define this, consideration will be given to the component $B_z$ of the magnetic field which is detected by the sensor C1. Let us look at component $dB_z/dy$ of the gradient of $B_z$ in the direction y substantially parallel to the main direction of magnetisation $V_A$. The extremum $P_z$ is defined as the point where $dB_z/dy$ is at its maximum (or minimum, in the case of negative values).

In fact, in order to measure a variation in the position of the magnet A, it is necessary to measure a variation in the magnetic field $\vec{B}$, as defined by formula (I) in annex I.

The positioning of the sensor is substantially chosen as a function of the spatial variation in the magnetic field $\vec{B}$. In fact, a substantial spatial variation in the magnetic field is desired. This spatial variation is the divergence ($\vec{\nabla} \cdot \vec{B}$) in the field defined by formula (II) in annex I.

The sensor C1 measures only one component of the magnetic field $\vec{B}$. This component is a scalar value, namely $B_z$ for the sensor C1. The variation in this component is thus represented by the gradient defined by formula (III) in annex I.

In other words, there is a direct correlation between the resolution of the position sensor and the component $dB_z/dy$ of the gradient calculated at the position of C1.

In FIG. 4, it appears that each gradient of the magnetic field is in a two-dimensional system (at least) in the plane of symmetry of the magnetic field and/or of the permanent magnet A. Thus, the gradients of the magnetic field define at least two respective curves $f(P_z)$ and $f(P_y)$ or $g(P_z)$ and $g(P_y)$. Each curve is described by its points and each point is a maximum gradient $dB_z/dy$ or a maximum gradient $dB_y/dz$. The symmetry of the magnetic field means that $f(P_z)=-g(P_z)$ and $f(P_y)=-g(P_y)$.

In the case of the sensor C1 determination of the extremum is easy. In fact, the curve $f(P_z)$ (or $g(P_z)$) is a straight line passing through the centre of the magnet and is perpendicular to the main direction of magnetisation $V_A$.

Like the sensor C1, the sensor C2 added according to the present invention is also positioned close to an extremum. Determining this extremum is more complex.

In order to define this extremum, consideration is given to component $B_y$ of the magnetic field which is detected by the sensor C2. Component $dB_y/dz$ of the gradient of $B_y$ is considered, in the direction z substantially perpendicular to the main direction of magnetisation $V_A$. The extremum $P_y$ is defined at a point where $dB_y/dz$ is at its maximum (or at its minimum in the case of negative values).

The sensor C2 measures the component $B_y$ (scalar value) of the magnetic field $\vec{B}$. Its variation is represented by the gradient defined by formula (IV) in annex I.

The sensor C2 is located at a second working distance from the magnet A, marked $d_{C2}$. More generally, the second sensor C2 is positioned on the surface of a sphere centred substantially on the centre O. The radius of this sphere may be between 500 µm and 2000 µm and preferably between 1100 µm and 1500 µm. Preferably, the radius of the sphere is substantially equal to 1360 µm, in other words $d_{C2}$=1.36 mm.

The essential condition that has to be respected is a positioning close to an extremum selected from all the extrema $P_{y1}, P_{y2}, P_{y3}$ etc. and to avoid physically knocking the magnet when the latter assembly is moved using the moving element.

Consequently, the sensor for measuring movement along axis y, namely the sensor C1, is arranged so that the variation in magnetic field which it detects is at a maximum for a displacement of the actuator in a direction according to the axis y; and similarly the sensor for measuring movement along the axis z, namely the sensor C2, is arranged so that the variation in magnetic field that it detects is at a maximum for a movement of the actuator in a direction along the axis z.

We will now look at the curve $f(P_y)$ (or $g(P_y)$), in the plane of symmetry of the magnetic field B (FIG. 4).

FIG. 9 is a three-dimensional graph showing the variations in the gradient $dB_z/dy$ as a function of the distances y and z to the centre of the magnet, of co-ordinates (0,0). The axes y and z are graduated in mm, and the ordinate on the right is in gauss per millimeter.

FIG. 10 is a graph plotted with x co-ordinates in direction y and y co-ordinates in direction z. It illustrates the location of the extrema for the sensor C2. Each extremum is plotted as the extremum for a given distance from the centre of the magnet, having co-ordinates (0,0), which are located outside the frame of the drawing. The graph in FIG. 10 corresponds to the curve shown in bold which descends forwards in FIG. 9. The curve is of a parabolic shape and may be adjusted to a polynomial of degree 2 or 3.

To summarise, in a particular preferred embodiment of the invention:
a. The distance $d_{C1}$ between the sensor C1 and the centre O of the permanent magnet A (or centre of the magnetic field) is 1100 µm. The sensor C1 is positioned on the support underneath the magnet A (centred coaxially) with $h_{C1}$=1100 µm in direction z. For C1, we have $dB_z/dy$=1000 gauss/mm.

b The distance $d_{C2}$ between the sensor C2 and the centre O of the permanent magnet A (or centre of the magnetic field) is 1360 µm. The sensor C2 is positioned diagonally with respect to the magnet A with $h_{C2}$=800 µm in direction z and $I_{C2}$=1100 µm in direction y. For C2, we have $dB_y/dz$=900 gauss/mm.

The microtechnology device according to the invention thus sends two magnetic field measurements for each moving element, which are supplied respectively by the sensor C1 and the sensor C2. The measurements are supposed to have been made here in the form of voltage, as a function of the magnetic field. The measurement is noisy. The sensor HAL401 has a resolution of between 4.2 and 5.5 mV/G (manufacturers data). The output voltages are between 0 and +4.5 V. An electronic packaging is matched, to filter the measurement noise and amplify the signal from −10V to +10V.

The movements of the moving element M impose on the magnet A movements in the plane yz, with a weak component along the axis x, taking into account the slight rotations required to move the moving element M with the deformations of the actuator.

The sensor C1 detects the variations in the component $B_z$ of the magnetic field, with the aim of obtaining the movements of the magnet along the axis y. For its part, the sensor C2 detects the variations in the component $B_y$ of the magnetic field, with the aim of obtaining the movements of the magnet along the axis z.

However, when it is desired to convert the magnetic fields detected by the sensors C1 and C2 into movements, there is a coupling, as a movement carried out purely along the axis y will trigger not only a variation in the component $B_z$ detected by the sensor C1, but also a variation in the component $B_y$ detected by the sensor C2.

FIG. 7 is a three-dimensional graph which shows the development of a magnetic field in two directions y and z as x coordinates, with a value Comp.Z as y co-ordinates, to which reference will be made hereinafter. It shows the coupling between the measurements carried out. The measurements are dependent on the positioning of the permanent magnet A.

It will be noted that Comp.Z is the magnetic field component measured on the sensor C1. It will be appreciated that the magnetic field sensors supply a voltage proportional to the magnetic field which they detect. Thus the equipotential curve Eq.B in FIG. 7 is defined, in the plane yz, by points (at y) for which the same value of Comp.Z is obtained. In the absence of a coupling, this curve Eq.B would be a straight line parallel to the axis z; there would be an identical value for Comp.Z regardless of the position of the magnet A in direction z. Consequently, the spacing of the curve Eq.B relative to a line parallel to the axis z passing through the measured value in the resting position of the magnet expresses the coupling between the measurements made by the sensors C1 and C2.

For example, looking at a variation in the measurement of 100% for a movement over the entire distance along the axis y of the permanent magnet A, a movement along the axis z over the entire distance of the magnet may have approximately a 20% influence on the measurement of the magnetic field. Consequently, the sensor C1 measuring a movement in direction y of the magnet A is disrupted by the movement of the latter in direction z.

This coupling may be corrected using an appropriate decoupling algorithm, using for example calibration data obtained in the presence of known movements. The algorithm used numerically reconstructs a theoretical image of the values of the components of the magnetic field that can be measured by C1 and C2, referred to as B1th and B2th. The algorithm uses the theoretical equations expressing the magnetic field generated by a permanent magnet, and the positions in space of the sensors relative to the permanent magnet A in the resting position $h_{c1}$, $h_{c2}$, $I_{c2}$. This numerical reconstruction makes it possible to create a matrix that assembles the positional couples sampled (y, z) and the pairs of components generated (B1th, B2th) at positions that can be reached by the moving element M. During operation of the device the algorithm makes use of the two measurements of C1 and C2, referred to as B1mes and B2mes, for which it seeks a match in the matrix, and finally finds the ideal couple (y, z) for the measurement carried out.

The variation in the magnetic field Bz detected by the sensor C1 as a function of the movements of the magnet in direction y will now be considered.

FIG. 8 shows the pattern of the variations in the magnetic field on the sensor C1 in the direction y according to the invention, where z is constant. The curve has a substantially linear part at low values of y (part marked in bold in FIG. 8).

The divergence in linearity along a path in the direction y of the moving element M has been studied. The graph in FIG. 8A compares the experimental measurements carried out with the device described to linear evolution (regression line) for the variation in the magnetic field Bz detected by the sensor C1 as a function of the movements of the magnet in the direction y, where z is constant.

At low values of y this divergence in linearity has been evaluated at a maximum of about 0.22% of the expected value (0.18 G for 80 G). As a result it can be stated that the curve can be regarded as linear and consequently the variation in the magnetic field Bz detected by the sensor C1 as a function of the movements of the magnet in the direction y may be also be regarded as linear, at low values of y.

FIG. 11 is a two-dimensional graph relating to the sensor C1 placed at the optimum point (y=0, z=−1.1). It illustrates the variation in the component Bz of the field (in gauss) as a function of the spacing in the direction y relative to the resting position of the magnet. In the family of curves, each curve is taken with a constant z, with values for z in the series (−1.3, −1.2, −1.1, −1, −0.9). The gradient is weakest for z=−1.3 mm and then increases with z.

FIG. 12 is a two-dimensional graph relating to the sensor C2, placed at the optimum point (y=1.1, z=0.8). It illustrates the variation in the component By of the field (in gauss) as a function of the spacing in the direction z relative to the resting position of the magnet. In the family of curves, each curve is taken with a constant y, with values for y in the series (1, 1.05, 1.1, 1.15, 1.2). The gradient is weakest for y=1.2 mm and then increases as y decreases.

FIG. 12 shows a particular zone of small size where the curves intersect, in the vicinity of z=0.88. At this point the variation in the position at y has virtually no influence on By. This zone is particularly interesting as there is a "natural" uncoupling of the measurement of By at that point. It will be noted that the value $h_{c2}$=0.8 mm is close to it.

FIG. 13 shows a spatial resolution Res (μm) as a function of the distance $d_0$ (mm) from the sensor to the centre O of the magnetic field of the invention. Three zones can be made out. There is a first zone ZI in which the measurements carried out can be utilised, a second safety zone ZII (safety distance between sensor and magnet) and a non-usable third zone ZIII.

The degradation in resolution is exponential along the distance between the sensor C and the centre O of the magnetic field. In other words, the closer the sensor is to the centre O of the magnetic field, the larger the gradient measured.

However, the magnet A has a physical form measuring several $mm^3$ (approximately 1 $mm^3$ in the embodiment shown) and consequently there then follows a non-usable zone ZIII for which the sensors would come into physical contact with the magnet A. It is moreover suitable to provide a safety distance to prevent the above-mentioned physical contact (zone ZII). In practice this will depend on the actual travel of the magnet A on the moving element M.

Moreover, the resolution of each sensor depends on a number of parameters and particularly the noise of the sensor. This noise is directly dependent on the sampling frequency, i.e. the speed of measurement. Generally it will be accepted that the longer a measurement, the better its resolution. However, the longer the measurement, the slower the dynamic.

The embodiment described uses sensors HAL401 with a sampling frequency of 100 Hz.

By placing the sensor as close as possible to the magnet and respecting the safety distance in the embodiment, namely a distance of 0.6 mm, a resolution of 60 nm is obtained. By adopting a position roughly 0.4 mm further away from the magnet, i.e. at a distance of about 1 mm, a resolution of 200 nm is obtained. These distances can be regarded as defining the usable zone ZI according to the invention.

One objective of the microtechnology device is to measure the travel of the actuator P or more precisely of the movable element M. It is thus important to obtain a sensitive measurement of position. Generally a resolution of 200 nm may be regarded as satisfactory. A resolution of about 100 nm would be better still.

It follows that, the smaller the dimensions of the magnetic system, the greater the local gradient. However, typically, the casings of the sensors (2.5×4.5×1.2 mm) are fairly large in relation to the sensitive zone of the sensor. All in all, the set of magnets and sensor elements in of the microtechnology device can be inscribed spatially in a sphere with a radius of about 10 mm.

The microtechnology device according to the invention is designed to measure travel of the moving element of less than or equal to 1 mm.

The actuator may be a piezoelectric actuator, a thermal actuator and/or an electrostatic actuator, or even a magnetic actuator. In the latter case the effects of the magnetic actuator on the sensors will be minimised and/or compensated.

Annex 1- Formulae $$\vec{B} = B_x \cdot \vec{x} + B_y \cdot \vec{y} + B_z \cdot \vec{z} \tag{I}$$

$$\vec{\nabla} \cdot \vec{B} = \frac{\partial B_x}{\partial x} + \frac{\partial B_y}{\partial y} + \frac{\partial B_z}{\partial z} \tag{II}$$

$$\overrightarrow{Grad\,Bz} = \frac{\partial Bz}{\partial x} \cdot \vec{x} + \frac{\partial Bz}{\partial y} \cdot \vec{y} + \frac{\partial Bz}{\partial z} \cdot \vec{z} \tag{III}$$

$$\overrightarrow{Grad\,By} = \frac{\partial By}{\partial x} \cdot \vec{x} + \frac{\partial By}{\partial y} \cdot \vec{y} + \frac{\partial By}{\partial z} \cdot \vec{z} \tag{IV}$$

The invention claimed is:

1. Microtechnology device, comprising:
    an actuator, designed to move a moving element relative to a support, this moving element comprising a permanent magnet,
    a first magnetic sensor (C1) designed to detect a movement of the magnet,
    characterized in that
    the actuator is designed to move a movable element in two degrees of freedom from a resting position, the permanent magnet is chosen to have a magnetic field distribution that presents a main plane of symmetry and a main direction of magnetization (AA) passing through a centre (O), the first sensor (C1) is placed substantially in the said main plane of symmetry, at a first working distance from the magnet, whereas a working axis (z) of this first sensor (C1) is substantially perpendicular to the main direction of magnetization (AA), and passes substantially through the centre (O), in the resting position of the magnet, a second magnetic sensor (C2) is provided, placed substantially in the main plane of symmetry of the magnetic field, at a second working distance from the magnet, whereas the working axis (y) of this second sensor is substantially parallel to the main direction of magnetization (AA), in the resting position of she magnet, the second sensor (C2) is positioned close to an extremum, for said second working distance, the said extremum being located at a position for which the component on the working axis (y) of the gradient (dBy/dz) of the component over the main direction of magnetization (AA) is at its maximum, the first and second sensors then being sensitive to the movements of the movable element perpendicularly to their respective working axes, wherein the second sensor (C1) is positioned on the surface of a sphere centered substantially on said centre (O) and having a radius of between 500 µm and 2000 µm.

2. Device according to claim 1, wherein the first sensor (C1) is positioned on the surface of a sphere centered substantially on said centre (O) and having a radius of between 500 µm and 2000 µm.

3. Microtechnology device according to claim 1, wherein each actuator is selected from the group comprising a piezoelectric actuator, a thermal actuator, a magnetic actuator and/ or an electrostatic actuator.

4. Microtechnology device according to claim 1, wherein the movable equipment of said actuator is arranged for translational movement of the magnet over a distance of between 0 µm and 200 µm in a direction (y) parallel so she main direction of magnetization.

5. Microtechnology device according to claim 1, wherein the movable part of the actuator is arranged for translational movement over a distance of between 0 µm and 400 µm in a direction (z) perpendicular to the main direction of magnetization.

6. Device according to claim 1, further comprising a digital control tool capable of storing the conversion parameters in order to convert magnetic field measurements made by the sensors into positional data for the magnet and/or movable equipment.

7. Device according to claim 1, wherein the first sensor (C1) is positioned on the surface of a sphere centered substantially on said centre (O) and having a radius of between 1000 µm and 1200 µm.

8. Device according to claim 1, wherein the first sensor (C1) is positioned on the surface of a sphere centered substantially on said centre (O) and having a radius substantially equal to 1100 µm.

9. Device according to claim 1, wherein the second sensor (C2) is positioned on the surface of a sphere centered substantially on said centre (O) and having a radius of between 1100 µm and 1500 µm.

10. Device according to claim 1, wherein the second sensor (C1) is positioned on the surface of a sphere centered substantially on said centre (O) and having a radius substantially equal to 1360 µm.

11. Microtechnology device, comprising:

an actuator, designed to move a moving element relative to a support, this moving element comprising a permanent magnet, a first magnetic sensor (C1) designed to detect a movement of the magnet, characterized in that the actuator is designed to move a movable element in two degrees of freedom from a resting position, the permanent magnet is chosen to have a magnetic field distribution that presents a main plane of symmetry and a main direction of magnetization (AA) passing through a centre (O), the first sensor (C1) is placed substantially in the said main plane of symmetry, at a first working distance from the magnet, whereas a working axis (z) of this first sensor (C1) is substantially perpendicular to the main direction of magnetization (AA), and passes substantially through the centre (O), in the resting position of the magnet, a second magnetic sensor (C2) is provided, placed substantially in the main plane of symmetry of the magnetic field, at a second working distance from the magnet, whereas the working axis (y) of this second sensor is substantially parallel to the main direction of magnetization (AA), in the resting position of the magnet, the second sensor (C2) is positioned close to an extremum, for said second working distance, the said extremism being located at a position for which the component on the working axis (y) of the gradient (dBy/dz) of the component over the main direction of magnetization (AA) is at its maximum, the first and second sensors then being sensitive to the movements of the movable element perpendicularly to their respective working axes, wherein the movable equipment of said actuator is arranged for translational movement of the magnet over a distance of between 0 µm and 200 µm in a direction (y) parallel to the main direction of magnetization.

12. Microtechnology device, comprising:

an actuator, designed to move a moving element relative to a support, this moving element, comprising a permanent magnet, a first magnetic sensor (C1) designed to detect a movement of the magnet, characterized in that the actuator is designed to move a movable element in two degrees of freedom from a resting position, the permanent magnet is chosen to have a magnetic field distribution that presents a main plane of symmetry and a main direction of magnetization (AA) passing through a centre (O), the first sensor (C1) is placed substantially in the said main plane of symmetry, at a first working distance from the magnet, whereas a working axis (z) of this first sensor (C1) is substantially perpendicular to the main direction of magnetization (AA), and passes substantially through the centre (O), in the resting position of the magnet, a second magnetic sensor (C2) is provided, placed substantially in the main plane of symmetry of the magnetic field, at a second working distance from the magnet, whereas the working axis (y) of this second sensor is substantially parallel to the main direction of magnetization (AA), in the resting position of the magnet, the second sensor (P2) is positioned close to an extremum, for said second working distance, the said extremum being located at a position for which the component on the working axis (y) of the gradient (dBy/dz) of the component over the main direction of magnetization (AA) is at its maximum, the first and second sensors then being sensitive to the movements of the movable element perpendicularly to their respective working axes, wherein the movable part of the actuator is arranged for translational movement over a distance of between 0 μm and 400 μm in a direction (z) perpendicular to the main direction of magnetization.

* * * * *